Sept. 4, 1962 W. G. FINK 3,052,508
FREEZER CABINET LOCKER UNIT
Filed Nov. 25, 1960 3 Sheets-Sheet 1

INVENTOR.
WILMER G. FINK
BY
McMorrow, Berman & Davidson
ATTORNEYS

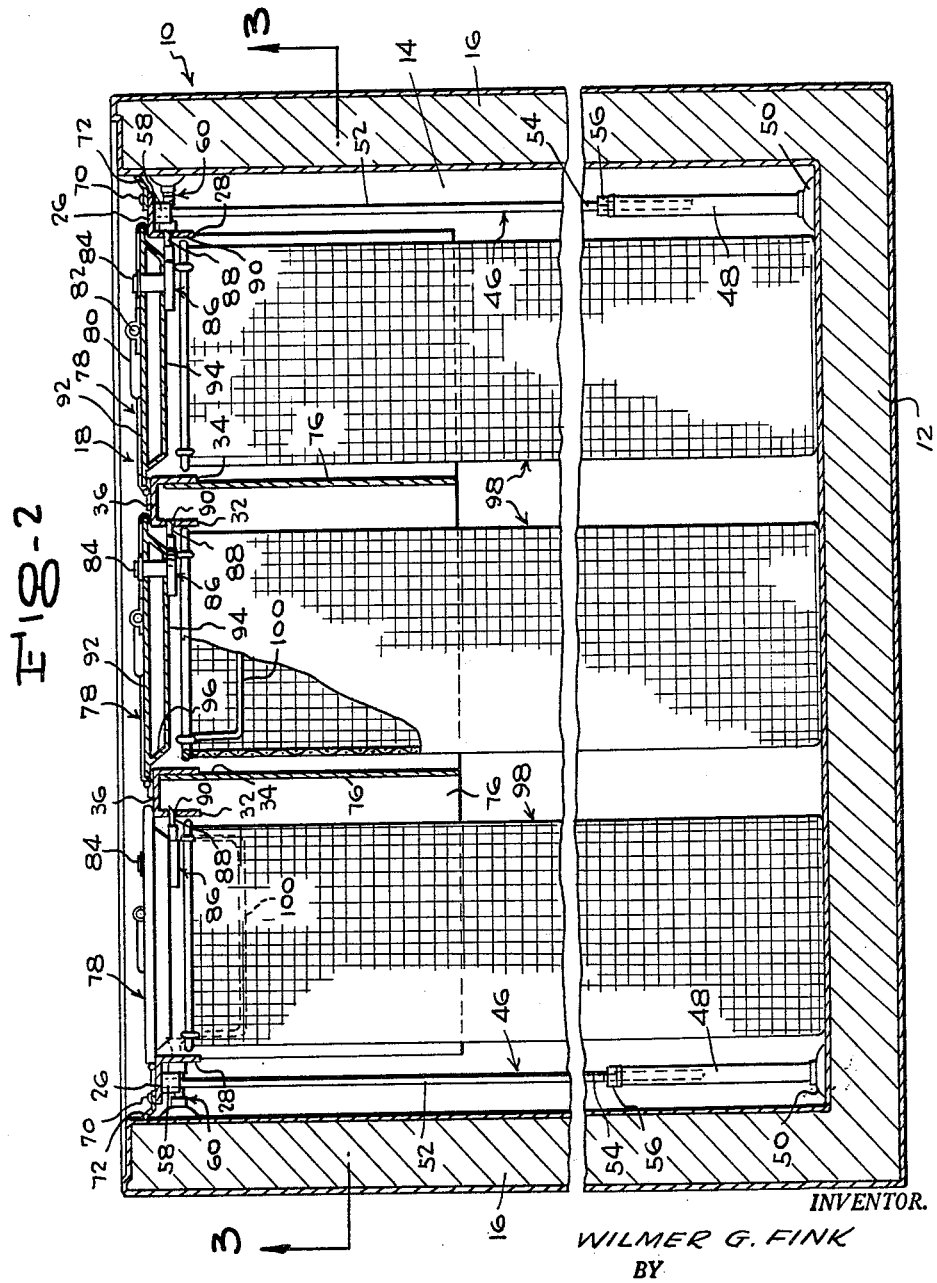

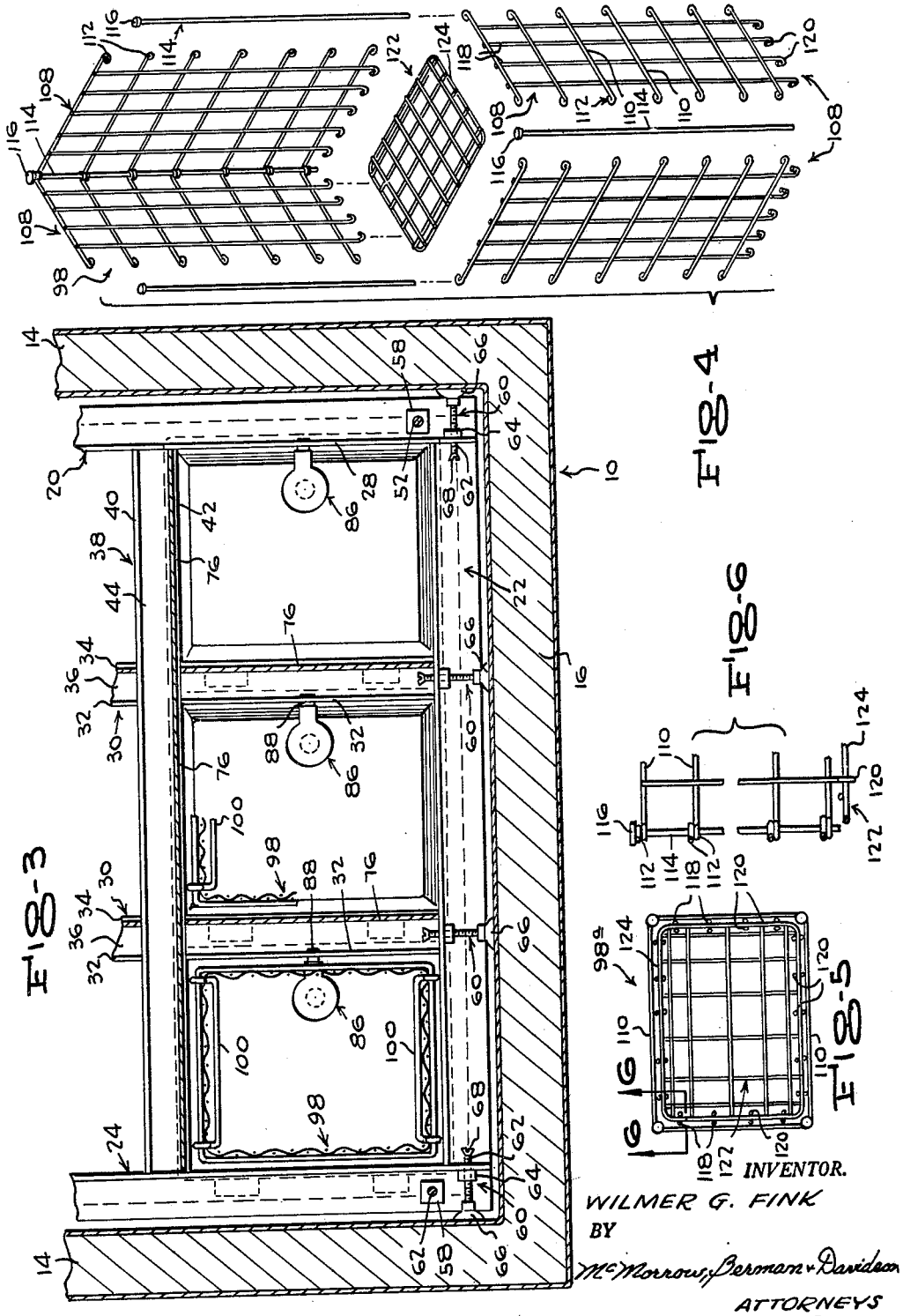

United States Patent Office 3,052,508
Patented Sept. 4, 1962

3,052,508
FREEZER CABINET LOCKER UNIT
Wilmer G. Fink, Viola, Wis., assignor to Viola Industries, Inc., Viola, Wis., a corporation of Wisconsin
Filed Nov. 25, 1960, Ser. No. 71,723
3 Claims. (Cl. 312—214)

This invention relates to a novel compartmented food freezer, and more particularly to a novel locker unit for installation in freezer cabinets, providing individually removable freezer lockers.

The primary object of the invention is the provision of a simple, practical, and efficient unit of the kind indicated which provides an ordinary food freezer cabinet with a plurality of individual food lockers which contain baskets which are separately and individually removable and insertible, without disturbing other baskets, so that accommodation of the needs and convenience of individual users, such as tenants of resorts, motels, trailer camps, and the like, is provided for.

Another object of the invention is the provision of an inexpensive locker unit of the character indicated above which has individually locked compartments which are protectively shielded from other compartments and which contain individual removable open-work food containing baskets, the unit having a frame which is adjustable in height, width, and length to fit freezer cabinets of different dimensions.

A further object of the invention is the provision of a unit of the character indicated above wherein the baskets are optionally adjustable in height, or provided in different fixed heights.

Other important objects and advantageous features of the invention will be apparent from the following description and the accompanying drawings, wherein, for purposes of illustration only, a specific form of the invention is set forth in detail.

In the drawings:

FIGURE 2 is an enlarged vertical transverse section taken on the line 2—2 of FIGURE 1;

FIGURE 3 is a fragmentary horizontal section looking upwardly on the line 3—3 of FIGURE 2;

FIGURE 4 is an exploded perspective view of an adjustable height basket;

FIGURE 5 is a top plan view of an adjustable basket; and

FIGURE 6 is an enlarged and contracted fragmentary vertical transverse section taken on the line 6—6 of FIGURE 5.

Figure 1:
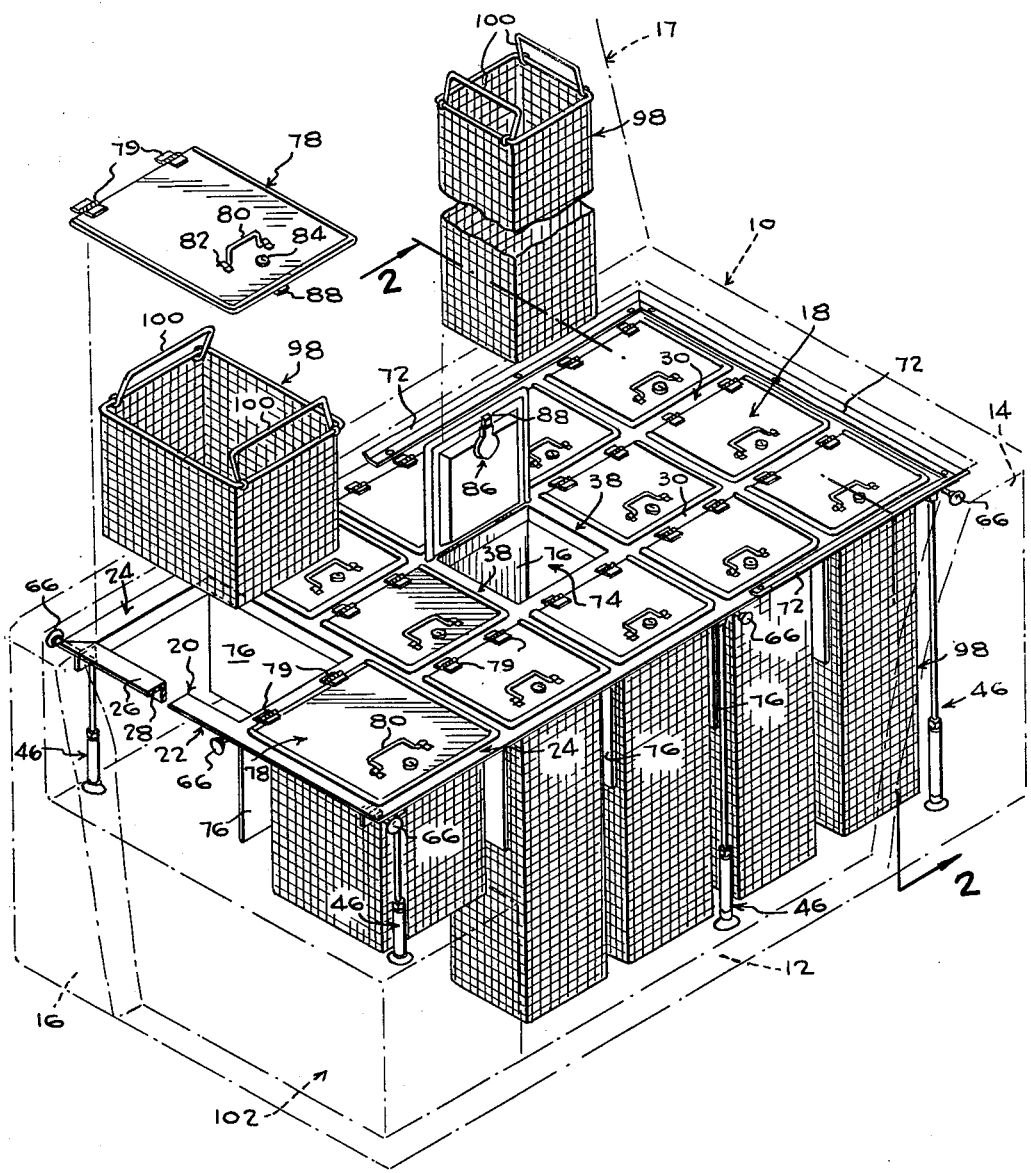
FIGURE 1 is a schematic perspective view showing a locker unit of the invention installed in a freezer cabinet, shown in phantom lines and broken away, a locker cover and baskets of different heights being shown removed from compartments or lockers of the unit.

Referring in detail to the drawings, wherein like numerals designate like parts throughout the several views, the numeral 10 generally designates a conventional open-top food freezer cabinet, having a bottom wall 12, end walls 14, and side walls 16, and having a suitable cover 17, the cabinet 10 having installed therein a locker unit 18 in accordance with the present invention.

The locker unit 18 comprises an open horizontal elongated rectangular frame 20, smaller in area than the interior of the cabinet 10, and having end members 22 and longitudinal side members 24, the members of the frame 20 preferably being angle-iron bars having outwardly directed horizontal flanges 26 and depending vertical flanges 28. Extending longitudinally between and suitably fixed to the vertical flanges 28 of the end members 22 are longitudinal inverted channel bars 30 having first and second vertical flanges 32 and 34, and webs 36, the channel bars being parallelly spaced from each other and form the frame side members 24. Transverse inverted channel bars 38 extend between and are suitably fixed to adjacent longitudinal channel bars 30, and to frame side members 24 and adjacent longitudinal channel bars 30, the transverse channel bars 38 being spaced parallel relative to each other and to the end members 22 of the frame 20. The transverse channel bars 38 have depending first and second vertical flanges 40 and 42, and webs 44.

For supporting the frame 10 above the cabinet bottom wall 12, and at the open top of the cabinet 10, the frame 20 is provided, at its corners, with vertically adjustable standards 46, which preferably comprise tubular lower sections 48 having enlarged diameter feet 50, on their lower ends, which bear upon the cabinet bottom wall 12, in the corners of the cabinet, and upper rod sections 52 which have threaded portions 54 which are threaded downwardly through nuts 56 affixed to the upper ends of the lower sections 48. The upper ends of the rod sections 52 engage in sockets 58, provided on the undersides of the horizontal flanges 26 of the frame 20, at the corners of the frame.

For stabilizing the frame 20, both laterally and longitudinally, in the cabinet 10, and for spacedly centering the frame in the cabinet, the frame 20 is provided, on the depending vertical flanges 28 of the end and side members, with horizontal laterally outwardly projecting adjustable brackets 60. The brackets 60 preferably comprise screws 62 which are threaded through nuts 64, fixed on the flanges 28, and which have enlarged diameter suction cups 66, on their outer ends, which are receivably engaged with the inner surfaces of the cabinet walls. Slotted head 68, on the inward ends of the screws 62, provided for adjusting the suction cups 66 toward and away from the cabinet walls.

For confining cold air within the cabinet 10, around the frame 20, the horizontal flanges 26 of the side and end members of the frame have secured thereon, as indicated at 70, and extending therealong, outwardly extending flexible strips 72, which are in downwardly tensioned engagement with the inner surfaces of the cabinet walls, as shown in FIGURE 2.

The intersections of the frame side members, end members, and transverse and longitudinal inverted channel bars, define individual rectangular lockers 74, and adjacent lockers are protectively isolated from each other by rigid imperforate vertical guard walls 76, which, as shown in FIGURE 2, are suitably affixed to the inward sides of the second depending flange 34 of the transverse and longitudinal channel bars 30 and 38, and extend downwardly therefrom, for a sufficient distance to prevent a person's easily reaching into any adjacent locker from a locker, and contaminating or removing the contents of such adjacent lockers.

The lockers 74 are further protectively enclosed by flat horizontal covers 78, which, as shown in FIGURE 1, are hinged, at one end, at 79, on the webs 36 of related longitudinal inverted channel bars 30, and have bail handles 80, at their other ends, which are hinged thereon, as indicated at 82, to lie flat upon the covers when not in use. In the regions of the handles 80, the covers 78 are provided with exposed lug-receiving barrels 84 of locks 86 which underlie the covers and have horizontal laterally outwardly, projectible bolts 88 which engage through detent openings 90, provided in the depending vertical flanges of the first flanges of the longitudinal channel bars and/or in the vertical flanges of the frame side members. The locks 86 can have differing keys (not shown) so that individual locker users are protected against trespass of their lockers.

As shown in FIGURE 2, the covers 78 are preferably in the form of hollow cold retaining bulkheads having flat upper plates 92, which, at their edges, rest upon the tops of the webs 36 of the channel bars and/or upon the horizontal flanges 26 of the frame side members, and reduced area bottom plates 94, the bottom plates 94 being connected to and downwardly spaced from the top plates 92, by sidewalls 96.

Removably positioned in the lockers 74 are food containing, wire-mesh baskets 98, which are rectangular in cross section and smaller in area than the openings of the lockers, and which rest upon the cabinet bottom wall 12, and have open upper ends which are positioned close to the undersides of the covers 78, the baskets being provided, on their upper ends with internal fold-down handles 100. As indicated in FIGURE 1, where a compressor housing 102 exists in a cabinet 10, and rises above the cabinet bottom wall 12, baskets 98 for lockers 74 above the housing 102, are proportionately shorter, to rest upon the housing 102, instead of the bottom wall.

Baskets 98ª of vertically disposed form, as shown in FIGURES 4 to 6, comprise adjacent wall panels 108 whose horizontal wires 110 have overlapping eyes 112, on their outer ends, which receive pins 114 therethrough which have enlarged stop heads 116 on their upper ends. The vertical wires 118 are connected together, at their upper ends, by a horizontal wire and have lower ends which extend below the lowermost horizontal wire and are provided with inwardly and upwardly curved hooks 120, which support a wire mesh bottom panel 122. The bottom panel 122 has a peripheral wire frame 124 which engages in the hooks 120.

Although there have been shown and described herein preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a rectangular freezer cabinet having a bottom wall, end walls, and side walls, a locker unit positioned in said cabinet, said locker unit comprising a horizontally disposed rectangular frame having longitudinal side members and transverse end members, said frame having a plurality of individual locker openings therein, vertical standards resting upon the cabinet bottom wall and engaged with the frame and supporting the frame spaced above the bottom wall, individual lockable covers hinged on the frame for the locker openings, vertical guard walls fixed on the frame and extending downwardly therefrom at sides of the locker openings, and removable wire-mesh baskets positioned in said openings within the guard walls and resting upon the cabinet bottom wall, said frame being smaller in area than the interior of the cabinet with its end members spaced from the cabinet end walls and its side members spaced from the cabinet side walls, and laterally adjustable frame centering brackets on the end members and side members of the frame and engaging the inward surfaces thereof.

2. In combination, a rectangular freezer cabinet having a bottom wall, end walls, and side walls, a locker unit positioned in said cabinet, said locker unit comprising a horizontally disposed rectangular frame having longitudinal side members and transverse end members, said frame having a plurality of individual locker openings therein, vertical standards resting upon the cabinet bottom wall and engaged with the frame and supporting the frame spaced above the bottom wall, individual lockable covers hinged on the frame for the locker openings, vertical guard walls fixed on the frame and extending downwardly therefrom at sides of the locker openings, and removable wire-mesh baskets positioned in said openings within the guard walls and resting upon the cabinet bottom wall, said frame being smaller in area than the interior of the cabinet with its end members spaced from the cabinet end walls and its side members spaced from the cabinet side walls, and laterally adjustable frame centering brackets on the end members and side members of the frame and engaging the inward surfaces thereof, said brackets having suction cups securably engaged with the inward surfaces of the cabinet walls.

3. In combination, a rectangular freezer cabinet having a bottom wall, end walls, and side walls, a locker unit positioned in said cabinet, said locker unit comprising a horizontally disposed rectangular frame having longitudinal side members and transverse end members, said frame having a plurality of individual locker openings therein, vertical standards resting upon the cabinet bottom wall and engaged with the frame and supporting the frame spaced above the bottom wall, individual lockable covers hinged on the frame for the locker openings, vertical guard walls fixed on the frame and extending downwardly therefrom at sides of the locker openings, and removable wire-mesh baskets positioned in said openings within the guard walls and resting upon the cabinet bottom wall, said basket comprising wire-mesh side wall panels having vertically spaced eyes on their side edges, and assembling pins engaged downwardly through the eyes and connecting the panels collapsibly together.

References Cited in the file of this patent

UNITED STATES PATENTS

| | | |
|---|---|---|
| 1,710,830 | Lowder | Apr. 30, 1929 |
| 2,065,006 | Zivanow | Dec. 22, 1936 |
| 2,119,438 | O'Leary | May 31, 1938 |
| 2,490,694 | Leutheuser | Dec. 6, 1949 |
| 2,701,746 | Piggott | Feb. 8, 1955 |

FOREIGN PATENTS

| | | |
|---|---|---|
| 1,145,788 | France | Oct. 29, 1957 |